C. W. GIBSON.
STABILIZING MECHANISM.
APPLICATION FILED DEC. 22, 1915.

1,309,888.

Patented July 15, 1919.
7 SHEETS—SHEET 7.

Inventor
Claude W. Gibson

Witness
Harry King

By Arthur S. Browne
Attorney

UNITED STATES PATENT OFFICE.

CLAUDE W. GIBSON, OF BOISE, IDAHO, ASSIGNOR OF ONE-FOURTH TO ALLEN B. EATON, OF BOISE, IDAHO.

STABILIZING MECHANISM.

1,309,888.  Specification of Letters Patent.  Patented July 15, 1919.

Application filed December 22, 1915. Serial No. 68,144.

*To all whom it may concern:*

Be it known that I, CLAUDE W. GIBSON, of Boise, in the county of Ada, in the State of Idaho, have invented certain new and useful Improvements in Stabilizing Mechanism, of which the following is a specification.

The object of the present invention is to rectify the position and the course of a traveling machine (such as a flying-machine, or other air craft or watercraft, including torpedoes and submarines) in case it is tilted or deflected from its proper position or course. The machine may tilt laterally under the action of disturbing forces and the present invention includes means to rectify such lateral tilt thereby stabilizing such machine. Also, the machine may dive or be deflected upwardly by disturbing causes and the present invention includes means for restoring the machine to the desired level or course. In either event in accordance with the present invention the position and the course of the machine is rectified.

This rectification may be effected automatically; also mechanically or manually if the machine carries an operator or pilot. That is to say, the present invention comprises means for automatically restoring the machine to its proper position; and also, the automatic characteristic can be rendered ineffective and the rectification can then be accomplished under mechanical control; or the rectification can be entirely by hand.

The following specification will refer specifically to one class of such machines, namely, the flying machine, and this is done not for the purpose of excluding the applicability of the invention to all such machines, but for the purpose of specific description and exhibition of the invention and its features and action.

Referring now specifically to a flying machine. under ordinary circumstances the normal flight of the machine can be regarded as the horizontal one, that is to say, the machine travels horizontally on an even keel. It is important, however, that other courses may be followed. When the machine is ascending or descending it does not travel horizontally but at an inclination. Likewise, when the machine is making a turn or traveling in a circular path it is important that it should be able to tilt laterally. In the event of the automatic control being in action, these angular or circular courses could not be followed (except to a limited degree permitted by the action of centrifugal force on the mercury masses employed causing electric contact to some extent) without disturbance from the automatic mechanism. Accordingly, the present invention includes means to enable the automatic control to be utilized whatever the position or course of the machine may be. For example, if a desired circular path or turn, or if a straight flight at a desired tilt of the machine, is being followed, the automatic controlling mechanism can be so set that it will cause the rectifiers of the machine to keep the machine at the desired tilt; and likewise if a desired upward or downward flight is being followed, the automatic controlling mechanism can be so set that it will keep the machine at the incline and will automatically restore it to the intended inclination in the event that the machine is deflected therefrom through disturbing causes.

These general objects and other important features of the invention will be understood from the following detailed description of one embodiment of the invention. This embodiment is illustrated in the accompanying drawings, wherein—

Figure 1:
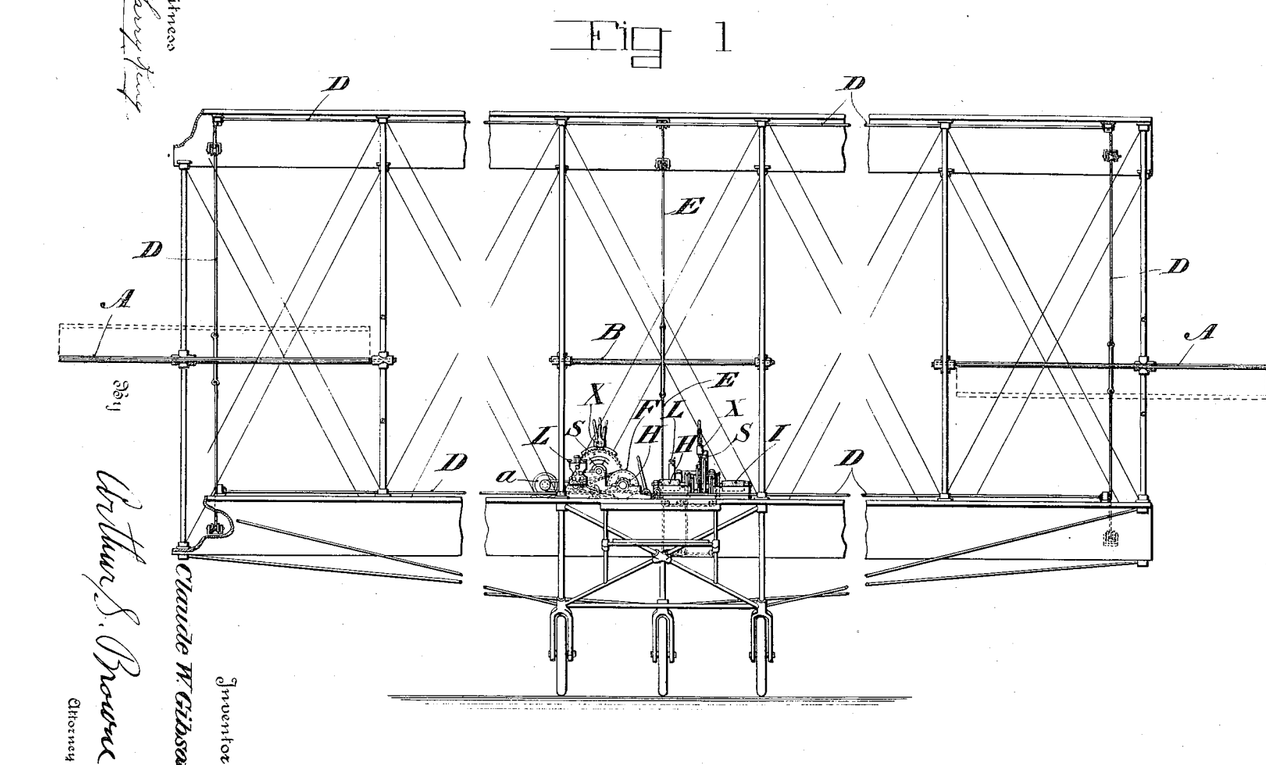
Figure 1, is a front view, partly broken away, of a conventionalized heavier-than-air flying machine equipped with the features embodying the present invention.
Figure 2:
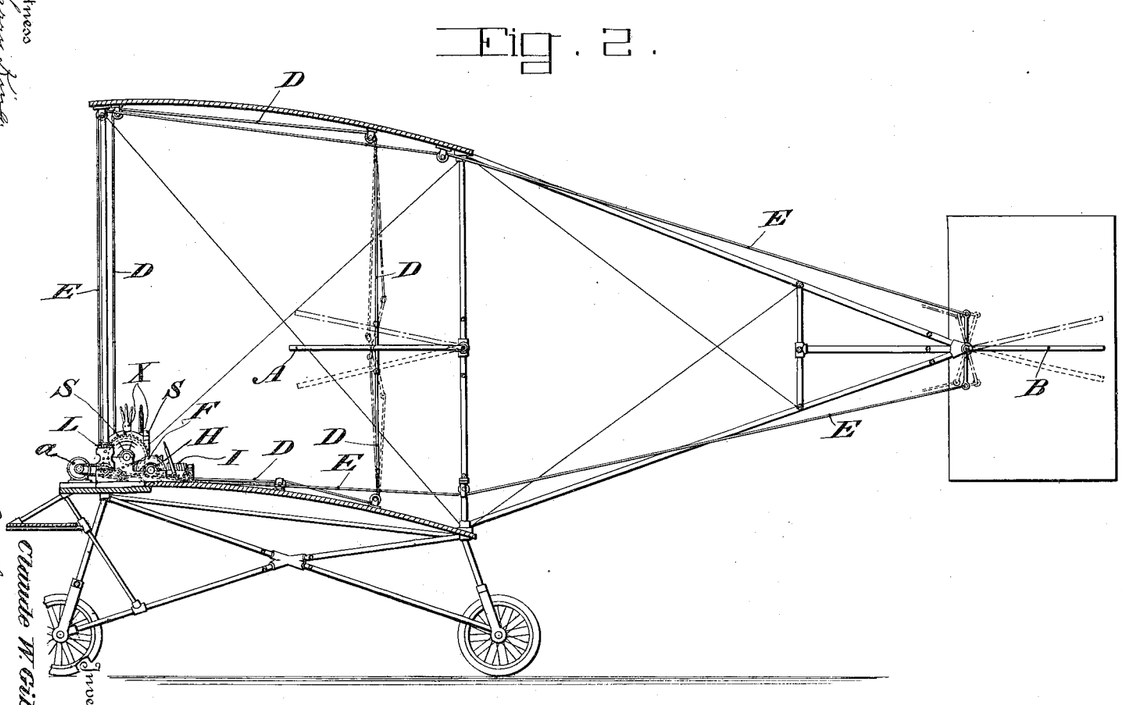
Fig. 2, is a side view of the same.

As illustrated in Figs. 1 and 2, the flying machine is equipped with laterally stabilizing rectifiers which are illustrated as deflecting planes or ailerons A. These ailerons are adapted to be tilted in order to rectify the lateral position of the machine in a manner which is now well known. Also, there is a rudder, rectifier or aileron B, at the rear of the machine, as shown in Fig. 2, which is adapted to be raised or lowered for the purpose of varying the inclination of the flight of the machine in a well known way. In accordance with the present invention there are two separate controllers, as shown in Fig. 1, one for the stabilizing rectifiers A, and the other for the flight inclination rectifier B.

The two controllers are alike and the description of one will serve for both, and both may be conveniently embodied in one frame. The controller for the lateral rectifiers A, has a drum C (Fig. 4) which is permanently connected by oppositely wound cables D, to the two ailerons A. These cables are conducted around guide pulleys and are connected to the two ailerons so that when the drum C, is turned in either direction the ailerons A, will be swung in the appropriate manner to rectify the position of the machine. The arrangement of such cables and the action of the stabilizing ailerons are well known and require no further description. In a similar manner the rear aileron or rectifier B, is connected by cables E, to the drum of the second controller.

The rotation of the drum C, in the proper direction is effected by electrically actuated mechanism, this being true whether the automatic control is utilized or the mechanical control is employed. The mechanical control is simpler in its mechanical details and, accordingly, will be first described.

At opposite sides of the drum C, are two wheels F, and G, which constantly rotate in opposite directions. These wheels can be rotated from any convenient source of power. A conventionalized motor is shown at $a$, in Fig. 4. This motor drives a countershaft $b$, through a belt $c$. This countershaft has two pulleys $d$ and $e$. The pulley $d$ is connected with the wheel F by means of the crossed belt $f$; whereas the pulley $e$ is connected with the wheel G, by the straight belt $g$, thus securing the continuous rotation in opposite directions of the wheels F and G. Gearing, obviously, may be used instead of belts $c$, $f$ and $g$. The drum C, and the two wheels F and G are of non-magnetic material and all turn loosely on the axle $h$.

Figure 4:
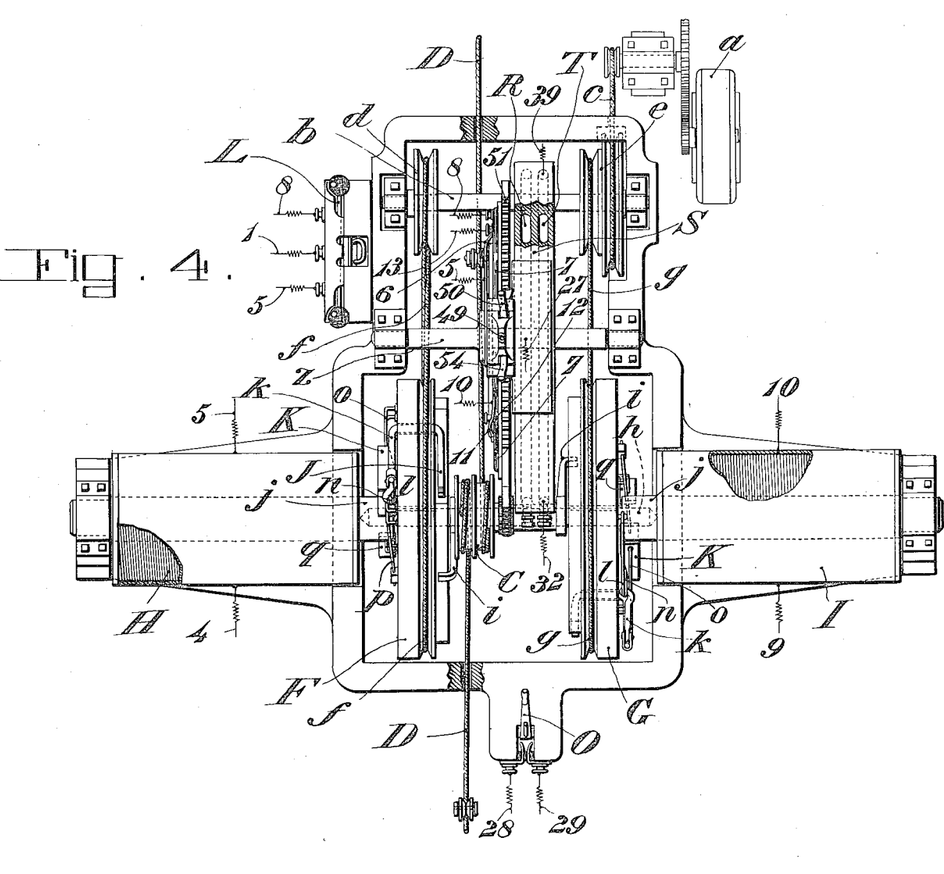
Fig. 4, is a plan view, partly broken away, of the controlling mechanism.
Figure 7:
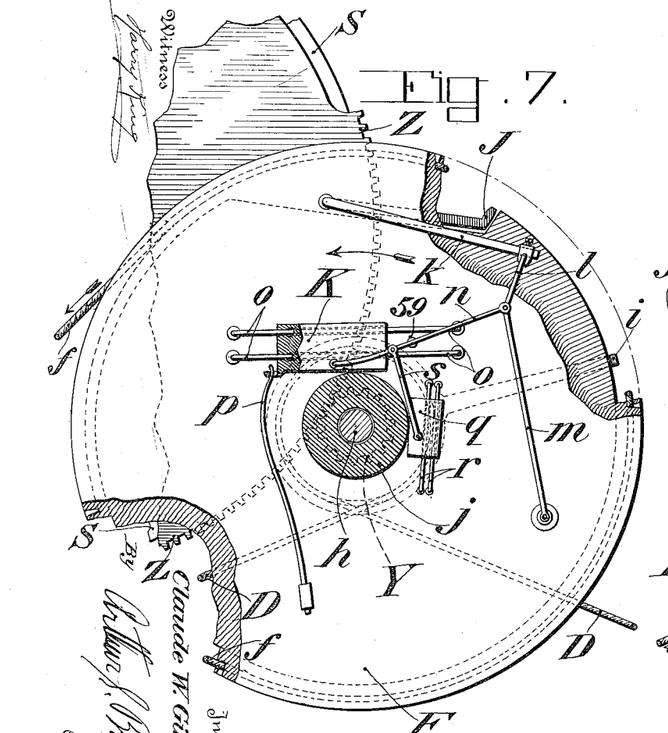
Figs. 7 and 8, are detail views illustrating the magnetic clutch or drag mechanism for connecting the continuously rotating wheels with the winding drum which is mechanically connected with the rectifiers.
Figure 8:
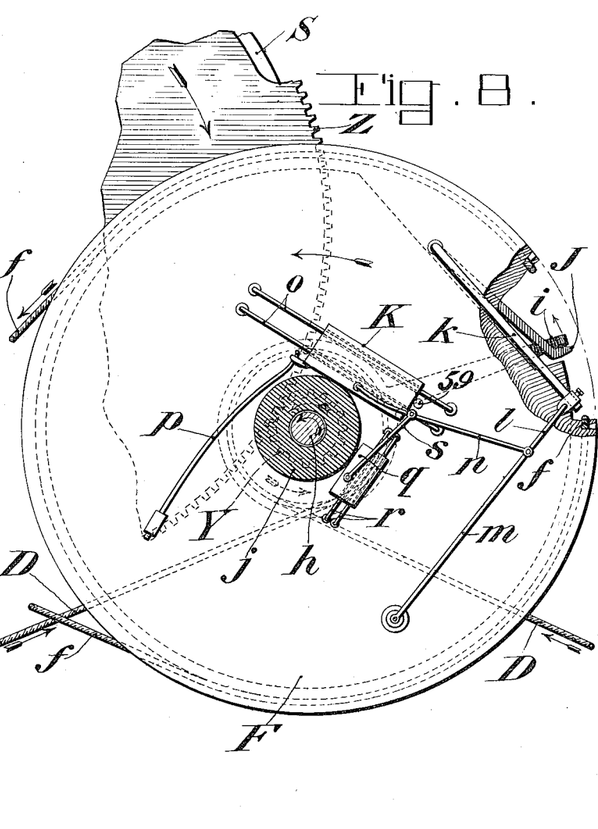

There are two stationary electro-magnets H and I corresponding respectively to the wheels F and G. Each of these magnets governs a mechanically actuated coupler by means of which the drum C, can be coupled to one of the wheels F and G, depending upon which of the electro-magnets H or I is magnetized. The two couplers are alike, one of them being illustrated in detail in Figs. 7 and 8. The drum C, has two oppositely projecting fingers $i$, as illustrated in Fig. 4, one of which coöperates with the wheel F, and the other with the wheel G. The number of fingers $i$, may be increased, if desired. One of these fingers $i$, and the wheel F, are illustrated in Figs. 7 and 8. This wheel F, carries a pivoted coupler J, which normally occupies the position shown in Fig. 7, where it cannot reach the finger $i$, during its rotation. This coupler J, is operatively connected with a sliding armature K, which coöperates with the stationary core $j$, of the stationary electro-magnet H. As shown in Fig. 7, the swinging coupler J, is connected with an arm $k$, which at its free end is connected with one arm $l$, of a toggle lever whose other arm $m$, is pivoted to the wheel F. The joint of the toggle is connected by a link $n$, with soft steel or soft iron sliding armature K. The armature K, slides on non-magnetic guide rods $o$ (carried by wheel F) and is maintained in its normal position, shown in Fig. 7, by the spring $p$. When, however, the electric current passes through the electro-magnet H, and this core $j$, is magnetized, the armature K, is pulled to the position shown in Fig. 8. The result is that the coupler J, is moved radially outward; so that, as the wheel F, continues to rotate, it comes into contact with the finger $i$, with the result that the drum C, is driven in the proper direction to move the rectifying ailerons A, in the proper direction to restore the machine to the desired keel.

It is important that the armature K, should not be permitted to push the toggle joint beyond the point where it raises the coupler J, to its highest level in order to connect with the finger $i$, and set the rectifying mechanism into action. For this purpose there is mounted upon the wheel F, a stop pin 59, at the point where it will permit the armature K, to slide only far enough to straighten the toggle lever out and thereby raise the finger $i$, to its maximum level.

To assist in the efficiency of the electro-magnet H, a secondary armature $q$, is employed. This secondary armature slides on non-magnetic guide rods $r$, located on the wheel F, and it is connected by a link $s$, to the link $n$. This auxiliary armature serves to pull the main armature K, down the more tightly on the core $j$, thereby causing more friction and thus increasing the efficiency of the actuating power of the armature K. The wheel G, is provided with a similar magnetic coupler.

In short, the wheel F, revolves in the direction of the illustrated arrow and carries with it the two armatures. When the core $j$, is not magnetized they freely travel around in contact with it. When, however, the core $j$, is magnetized, the magnets K, and $q$, cling to the core through magnetic attraction and friction and hence are dragged thereby to the position illustrated in Fig. 8. Accordingly, it is evident, that if an electric current passes through either of the electro-magnets H or I, the drum C, will be rotated in one direction or the other thereby moving the ailerons A, in the proper direction to rectify the position of the machine.

Figure 5:
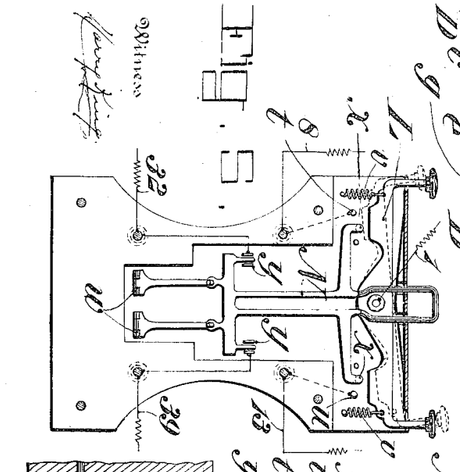
Figs. 5 and 6, are detail views of the switch mechanism which renders active or inactive the automatic control, the mechanical control and the handcontrolled devices, as desired.
Figure 6:
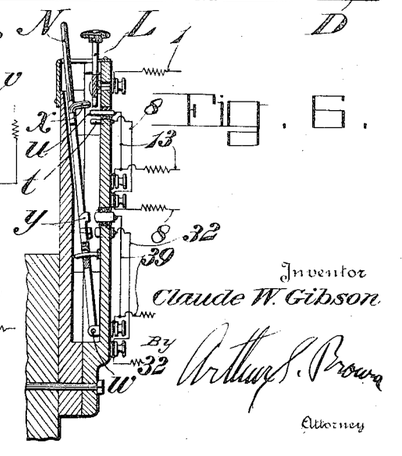

The electric circuits through these electro-magnets H and I, may be mechanically, or hand, or automatically controlled. The mechanical control is illustrated in Figs. 5, 6 and 9.

A double acting hand switch is shown at L, it being provided with two hand knobs of insulated material. The switch itself is of electro-conductive material and it is connected at its middle by wires 1 and 2, with one pole of an electric generator M. This switch L, coöperates with two electric contacts $t$ and $u$, which are in electric communication with the opposite pole of the generator M.

Figure 9:
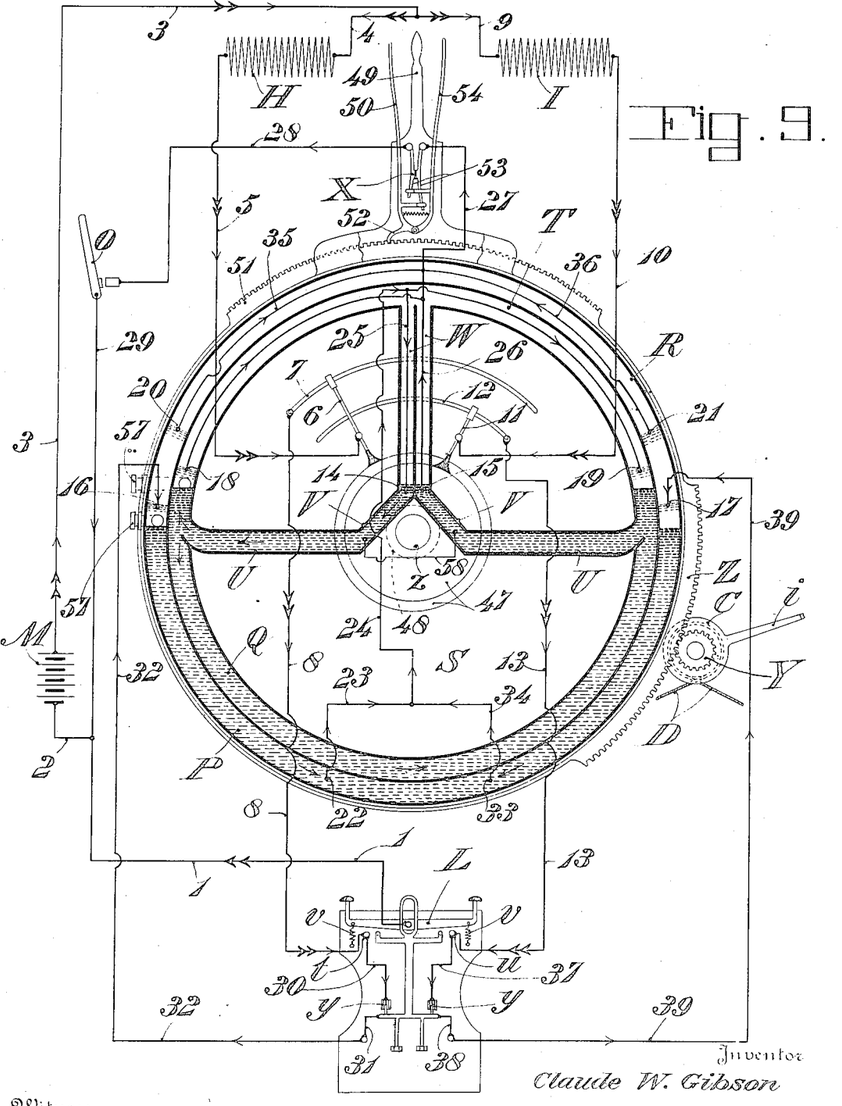
Fig. 9, is a diagram illustrating the electrical connections used both for the automatic, and the mechanical controls.

Fig. 9, shows by heavy double arrows the electric circuits which are utilized when the mechanical hand controlled switch L, is employed. Assume that the switch L, is manually depressed at the left so as to make electrical connection with the contact $t$. The circuit is then as follows:

From switch L, by wires 1 and 2, to the generator M; thence by wires 3 and 4, to the electro-magnet H; thence by wire 5, to brush 6; thence to contact plate 7; and thence by wire 8, to the contact $t$, thus completing the circuit. This energizes the electro-magnet H, and hence rotates the drum C, in one direction thereby shifting the rectifying ailerons A, in the desired direction to restore the machine to the desired keel.

On the other hand, if the switch L, is depressed at its right hand end thereby making electric connection with the contact $u$, the circuit is then as follows:

From switch L, through wires 1 and 2, to the generator M; thence by wires 3 and 9, to the electro-magnet I; thence by wire 10, to brush 11; thence to contact plate 12; and thence by wire 13, to the contact $u$, thus completing the circuit. This energizes the magnet I, and thereby the drum C, is rotated in the opposite direction, thereby shifting the rectifiers A, to restore the machine to the desired keel.

The hand controlled switch L, is normally maintained in its neutral position in communication with neither of the contacts $t$, and $u$, by the centralizing springs $v$.

When the automatic controlling devices are employed the hand switch L, is rendered inoperative and the circuits peculiar to the automatic control are rendered effective. To effect this a switch N, shown in Figs. 5 and 6, is employed. This switch is pivoted at its lower end at $w$, and stands in the position shown in Fig. 6, when the hand controlled switch L, is used. When the automatic control is to be utilized, the upper end of this switch N, as shown in Fig. 6, is moved to the right, thereby bringing two stops $x$, carried by it, beneath the switch L, thereby preventing the switch L, from being moved downwardly sufficiently to connect with either of the contacts $t$ or $u$. Concurrently, the same movement of the switch N, closes the knife switches $y$, which are necessary to complete the automatically controlled circuits. These switches are open as shown in Fig. 6, thereby breaking the automatic circuits whenever the mechanical hand controlled switch L, is operative.

Figure 3:
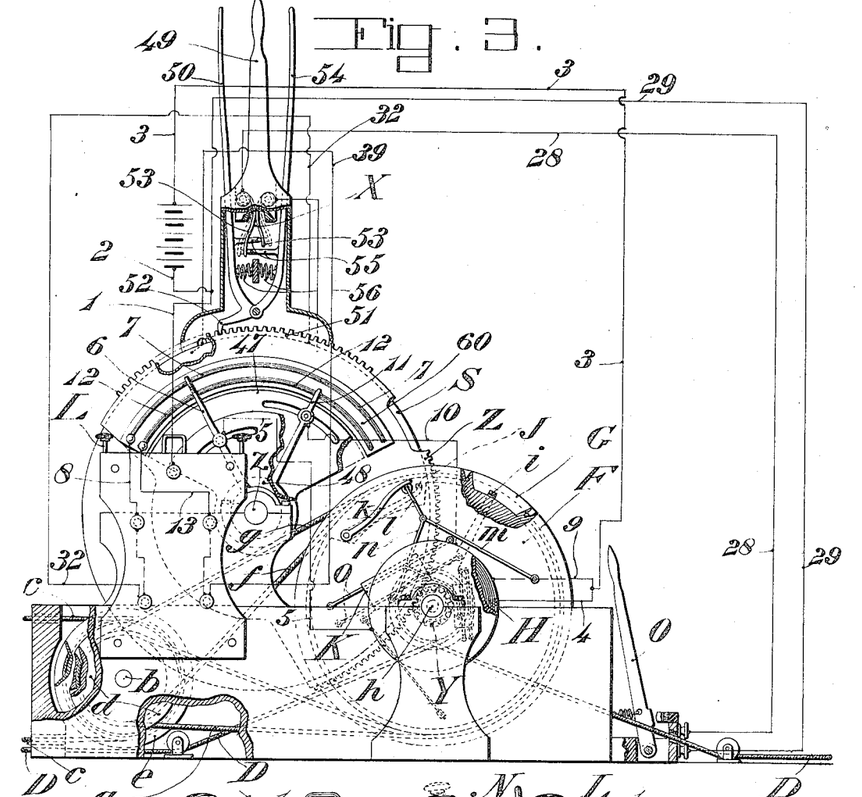
Fig. 3, is an elevation, partly broken away, of the controlling mechanism.

The automatic circuit is also governed by the hand manipulated knife switch O, shown in Figs. 3 and 9. By means of this switch O, the automatic circuit can be opened or closed at will.

The automatic control is by means of a gravity switch shown at P, in Fig. 9, with which coöperates the gravity-inertia switch shown at Q, in the same figure. Each of these switches is constituted by a column of mercury. The column of mercury constituting the gravity switch P, is located within a circular tube R, permanently carried by an oscillating support S, which turns on an axle $z$, which axle is permanently fixed to the frame of the controller which frame is designed to be bolted to the machine. The gravity-inertia switch Q, is likewise composed of a mass of mercury which is located in a labyrinth of tubes also permanently carried by the support S. The circuit cannot complete itself through the gravity-inertia switch Q, except by passing through the conduit wire 24, which is normally necessary; but when the tilt is sufficient to bring the mercury in switch P, in contact with electrode 20 or 21, the current also has a concurrent circuit through the conduit wire 35 or 36, depending on the direction of tilt. This labyrinth of tubes comprises a circular channel T, and two horizontal channels U, each of which communicates with the top of the circular channel T, by means of an inclined channel V, and a vertical channel W. The mercury is supplied to the labyrinth of tubes in sufficient quantity to normally maintain the horizontal channels U, and the inclined channels V, slightly more than filled. For convenience, Fig. 9, illustrates circular channels R and T, as concentric, and the channel R, of a greater diameter than channel T. This, however, is merely for convenience in illustration because in practice these channels are side by side and of the same diameter, as illustrated in Fig. 4.

Normally the level of the mercury P, is in a horizontal plane passing through the axis of the axle z; while the level of the mercury Q, is somewhat higher being sufficient to submerge two electrodes shown at 14 and 15, in Fig. 9, a little above the upper ends of the two inclined channels V. Under ordinary circumstances these electrodes 14 and 15, are always slightly submerged in the mercury Q, even when the support S, tilts, this being due to the fact that these electrodes are located above and as close as practicable to the axis on which the support swings.

There are two electrodes 16 and 17, located in the channel R, above the normal level of the mercury P. There are likewise two electrodes 18 and 19, located in the channel T, above the normal level of the mercury Q. There are also two additional electrodes 20 and 21, in the channel R, far enough above the electrodes 16 and 17, respectively, to avoid being reached by any splashing of the mercury, while the support S, is at its normal level.

Electrode 18 is auxiliary to and in direct communication with electrode 15, and they are both in circuit with the exit wire 27, Fig. 9. Electrode 19, is auxiliary to and in direct communication with electrode 14, and they are both in circuit with the entrance wire 24. These electrodes 14 and 15, and 18 and 19, depend on mercury Q, for electric making and breaking; and they are all parts of the gravity-inertia or anti-oscillating feature of the invention, which feature is designed to break the circuit at the electrode 14 or 15, as the case may be, when the circuit is closed at electrode 16 or 17, through inertia while the machine is at or about the normal level, and this feature designedly permits a closing of the circuit only upon tilts of the machine.

Assume now that the machine tilts laterally in one direction, the support S, carrying switches P and Q, is correspondingly tilted, and if the tilt is in one direction the electrode 16 (at the left to Fig. 9) will be submerged in the mercury P (constituting the gravity switch) so that a circuit indicated by the single light arrow heads in Fig. 9, will then be established, as follows:

From the electrode 16, through the mercury P, to the electrode 22; thence by wires 23, 24 and 25, to the electrode 14, which still remains submerged in the mercury Q, by reason of its nearness to the axis on which the support S, turns; thence through the mercury Q, to the still submerged electrode 15; thence by wires 26 and 27, to the closed switch X; thence by the wire 28, to the now closed switch O; thence by wires 29 and 2 to the generator M; thence by wires 3 and 4, to the electro-magnet H; thence by wire 5, to brush 6; thence to contact plate 7; thence by wire 8, to contact t; thence by wire 30 to the left hand knife switch y; and thence by wires 31 and 32, to the electrode 16, thus completing the circuit. The effect is to magnetize the electro-magnet H, thereby rotating the drum C, in the proper direction to rectify the lateral tilt in the manner hereinbefore described.

It is important that the rotation in one direction of the drum C, should be discontinued just as soon as the rectifying ailerons A, have been tilted sufficiently for their rectifying purpose. Otherwise, the rectifying ailerons may be tilted so far as to more than perform their rectifying office, thus setting up an oscillation back and forth of the machine. The improvements of the present invention are organized to avoid this. To this end the drum C, has a pinion Y, which meshes with a rack Z, on the support S. Hence, when the drum C, is rotated the support S, is likewise rotated and in a direction to restore the gravity and gravity-inertia switches P and Q, to their normal level (toward which the mechanism constantly strives to return them) with the result that the electric contact is broken at the electrode 16. If at this time the effect of the rectifying ailerons A, is sufficient, the machine will begin to return to its desired keel, whereupon the electrode 17, will become submerged in mercury P, and the other electromagnet I, will become energized with the result that the drum C, rotates in the opposite direction causing ailerons A, to begin to return to their normal position concurrently with the returning of the machine to its normal position. If, however, the effect of the deflected ailerons A, is not sufficient to cause the machine to begin to return to its desired keel but on the other hand it continues its tilting movement in the same direction as that under consideration, the electrode 16, will again be submerged in the mercury P, with the result that there will be a repetition of the above described movements. The quick action of the mechanism ordinarily does not permit the support S, to reach more than a few degrees from its normal level at which position neither electrode 16 or 17 is submerged. This feature of the invention is distinctive and important for the reason that it gives to the switches P and Q, and to the rectifiers movements relative to and in practical unison with the lateral movement of the machine, and not a jerky, or pre-determined movement.

Assume now that the machine and the support S, both tilt in the opposite direction from that above described, so that the electrode 17 (Fig. 9) is submerged in the mercury mass P, at which time the electrodes 14 and 15, are still submerged owing to their nearness to the axis on which the support S, turns. This closes an electric circuit as follows:

From electrode 17, through the mercury P, to the electrode 33; thence by the wires 34, 24 and 25, to the electrode 14; thence by the mercury Q, to the electrode 15; thence by wires 26 and 27, to the closed switch X: thence by wire 28, to closed switch O; thence by wires 29 and 2, to generator M; thence by wires 3 and 9, to the electro-magnet I; thence by wire 10, to brush 11; thence to contact plate 12; thence by wire 13, to contact u; thence by wire 37, to the right hand closed knife switch y, and thence by wires 38 and 39, to the electrode 17, thus completing the circuit.

This magnetizes the electro-magnet I, and hence rotates the drum C, in the correcting direction as heretofore described. At the same time the support S, is concurrently rotated back to the normal level through the pinion Y, and the rack Z, thus breaking the electric circuit at electrode 17. After this the same results and action follow as above described. Thus, through the employment of the rotatably mounted support S, permanently holding the gravity and gravity-inertia switches, a movement of the rectifiers, within their pre-adjusted limits, in practical unison and concurrence with the tilt of the machine is provided, both in the correcting and restoring movements of the rectifying ailerons, and any violent surging or oscillating movement of the machine is avoided.

The gavity-inertia switch, as thus far described, has acted simply as a second gravity switch to keep the electrodes 14 and 15 submerged through the passage of mercury back and forth through the small channel 43, of channel T, and has contributed in the action of the gravity switch P, by constituting a part of the electric circuit. It could have been cut out of the circuit by connecting entrance wire 24, with exit wire 27, and still the gravity switch would perform its function.

Its true function, however, is due to its inertia action whereby it prevents any accidental closing of the governing electric circuits. The inherent defects of a gravity or pendulum switch is that oscillations are apt to be given to it owing to any sudden or disturbing movements of its support or of the machine. In the case of the gravity switch used in coöperation with the laterally stabilizing rectifying ailerons A, any severe lateral shock given to the machine, although it be at the level keel, will set the gravity switch P, oscillating with the danger of unnecessarily making and breaking the electric circuits and thereby deflecting the ailerons and setting the entire machine into oscillation. It is to prevent this that the inertia switch Q, is employed. It is installed in the circuit between the entrance wire 24, and exit wire 27. As already stated, the two circular channels R and T, are of the same diameter instead of being arranged of different diameters and concentrically as conveniently illustrated in Figs. 9 and 10, so that the mercury mass Q, will partake of the same oscillations as the mercury mass P. This concurrent oscillation of the mercury mass Q, is utilized to break the circuit at the electrode 14 or 15, of the gravity-inertia switch, whenever the mercury splashes up so as to come in contact with the electrode 16 or 17. To facilitate this action the specific relation between the various branches of the labyrinth of tubes containing the mercury mass Q, and its electrodes, which are illustrated in Fig. 10, is employed.

Figure 10:
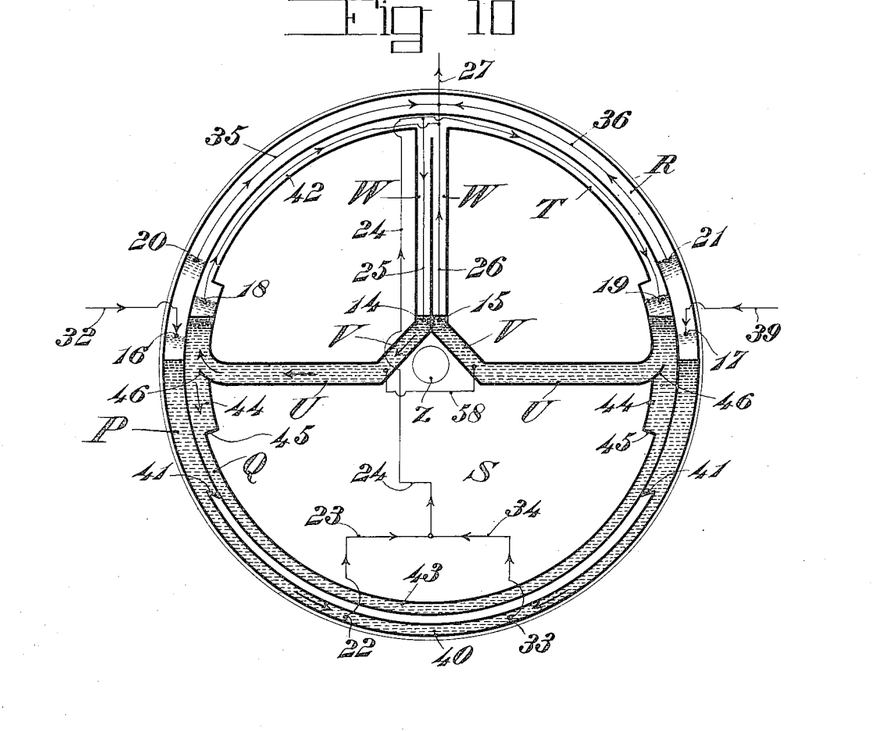
Fig. 10, is a diagram illustrating the preferred gravity switch and the gravity-inertia switch.

As shown in Fig. 10, the upper and lower sections 42 and 43, of the labyrinth of channels containing the mercury mass Q, are smaller than the middle sections 44, and are likewise smaller than the horizontal channels U. The inclined channels V, and the vertical channels W, are smaller than the horizontal channels U. The bottoms of the channels U, curve upwardly at their ends 46, and extend partly across the sections 44. The mercury in the two channels U, can be electrically connected by a bridge wire as shown at 58, in Fig. 10.

The construction of the channel T, as well as the position of the electrodes therein is important, in addition to reasons already given, for the following reasons:

First, the smaller cross section of T, at 43, as compared with the cross section of T, at the outer ends of channels U, restricts the amount of flow of the mercury mass Q, in either direction by lateral or other disturbing motions when the gravity-inertia switch Q, is at or near its normal level, and by this restriction a greater amount of concurrent mercury flow is permitted from the large channel U, into the large sections of channel T, above points 46, to greatly lower its level in the small channels W and V, to break the circuit the more easily at the electrode 14 or 15, as the case may be, so that although the circuit be closed at one of the electrodes 16 or 17, in switch P, due to such disturbance, it is concurrently broken in the switch Q, at electrode 14 or 15, according to the direction of the disturbing movement. The disturbing cause in switch P, is due to inertia of the mercury P, but the concurrent inertia of the mercury Q, is utilized to destroy the disturbing inertia in the switch P.

Second, although the channel at 43, is smaller to prevent excessive flow, it is large enough to permit enough mercury to flow, when switch Q, is tilted, to prevent the mercury in the channels W, from lowering upon tilts, which effect is indispensable; and it is desirable that such level in the channels W, should be raised upon a tilt to render more difficult the breaking of the circuit at the electrode 14 or 15, by inertia, when switch Q, is tilted because this anti-oscillating feature requires that the circuit should be broken easily at normal level of switch Q, but with more and more difficulty as the tilt becomes greater, and not at all when a considerable tilt is reached.

Third, the projections 46, tend to prevent mercury in the channels U, from flowing out and around channel 43, upon tilting, or by inertia after a tilt; and it is desirable that the channels U, retain most of their mercury at all times, otherwise more time would be required for their refilling on the return to level, and also an excessive amount of mercury would uselessly flow back and forth through the channel T, at 43. These projections 46, also tend to decrease resistance to the flow of mercury from channel U, when the circuit is being necessarily broken at electrode 14 or 15.

Fourth, the uniform size of the channel T, at sections 44, on each side of the switch, causes the mercury to rise on the one side to the same arc that it lowers on the other side, up to the point where the rising surface reaches the smaller channel 42, at which time the general level of the mercury rises higher above electrodes 14 and 15, and also above electrode 18 or 19, according to the direction of the tilt, for the reason that section 44, on the lowering side and opposite to the mercury level in section 42, is larger in cross section than the cross section of section 42. This general elevation of mercury level is advantageous to make more difficult the breaking of the circuit at 14 or 15, upon a considerable tilt as already stated.

Fifth, the position of the electrodes 14 and 15, causes the one on the lower or tilting side to become submerged, upon tilting, more deeply than the other one. If the tilt be great enough the mercury column will separate at the point 46. It is desirable that both electrodes 14 and 15, not only remain submerged at all times in the absence of the disturbing forces, but that they become submerged more deeply upon considerable tilts. After the mercury column is broken at points 46, disturbing movements might cause the mercury in the channels U, on the broken side, to splash over these projections to such an extent that the electrode 14 or 15, on that side would be altogether disengaged from the mercury, which effect is not desired when the support S, is at a tilt. Moreover, it is desirable that most of the mercury in the channels U, remain there to prevent an excessive shifting of the mercury to refill the channel U. Points 46, tend to prevent such splashing over. Electrodes 18 and 19 are inserted to increase the submergence of electrodes 14 and 15, upon tilts and also to prevent the disengagement of 14 or 15 at a tilt due to such splashing. For example, on a right tilt, electrode 14, is submerged less than electrode 15, which may become entirely disengaged by such splashing, but in either event electrode 19, directly in communication with electrode 14, becomes rapidly submerged with the effect of rapidly submerging electrode 14. When the support S, is level, in the absence of disturbing forces, electrodes 14 and 15, are submerged but at such times neither electrode 18 or 19, is submerged. At such time a shifting of the mercury by disturbing forces, such as a lateral movement of the machine, causes the mercury to recede from or advance toward as the case may be electrodes 14 and 19, or electrodes 15 and 18.

Sixth, the smaller cross section of channels W and V, as compared with the larger cross section of channels U, and the part of section 44, above the points 46, insures a greater receding of the mercury from electrode 14 or 15, according to the direction of the disturbing force.

Seventh, the bridge wire 58, preserves the circuit if for any cause the mercury column should separate at the points of projections 46, before it reaches the electrode 18 or 19, directly opposite, as the case may be. But the construction of the tube is designed to prevent such separation prior to the contact of electrodes 18 or 19 with the mercury.

Eighth, all electrodes preferably should have blunt points, should be short and as small a diameter as practically possible, to insure efficient contact with and breaking from the mercury, and each should terminate in the axis of its channel to prevent improper contact at any position of the mechanism. Also all wires leading to the electrodes and elsewhere should be insulated, and the electrodes should be made preferably of iron or platinum.

Assume now that there should be a lateral shock to the machine or to the support S, which would tend to make the mercury mass P, shift to the right in Fig. 10, and make contact with the electrode 17. The same lateral shock would tend to move the mercury in the right hand horizontal channel U, to the right and owing to the smallness of the inclined channel V, and vertical channel W, as compared with the channel U, and the section 44, of the labyrinth, the mercury would descend in the right hand inclined channel V, and in the right hand channel W, and in the left hand section 44, of channel T, so as to lower its level beneath the electrode 15, thereby breaking the circuit which otherwise would be closed by the submergence of the electrode 17, in the mercury mass P.

In a similar manner, if there be a lateral shock in Fig. 10, which causes the mercury mass P, to splash upwardly at the left and submerge the electrode 16, the same shock would cause the mercury in the left hand horizontal channel U, to move to the left with the result that the mercury in the small left hand inclined channel V, and left hand vertical channel W, would descend so as to break the circuit at the electrode 14, which would otherwise be closed by the submergence of the electrode 16, in the mercury mass P. In other words, any splashing of the mercury in the channel R, which would tend to close the circuit is off-set by a corresponding splash of the mercury in the labyrinth of tubes which is followed by a breaking of the circuit. Hence, the circuit is not closed as the result of the lateral jars or movements of the machine. This result is due to the inertia of the mercury in the labyrinth of channels and it is therefore called the "gravity-inertia" switch because it acts through inertia to perform its primary object, with the effect that the circuit can be closed only by a tilt. This eliminates the closing of a circuit by splashing, that is to say, by inertia in the mass P. The large size of the channels U, and the sections 44, as compared with the small size of channels V, in which the electrodes 14 and 15, are located, is an important characteristic, because a small movement of the mercury mass Q, suffices to lower the level of the mercury below electrodes 14 or 15, as the case requires, when support S, is at or near normal level.

The contraction of the channel T, at 43, is important because it restricts the tendency of the mercury mass Q, to splash in either direction while permitting sufficiently free passage of the mercury during the normal tilting. Similarly, the channel R, is illustrated as of smaller size at the bottom section 40, between the points 41, for the same reason. Both channels R and T, extend throughout an entire circle thereby affording room for the air in the upper parts of the tubes to move when the mercury does, without being compressed.

The channel R, is provided with emergency electrodes 20 and 21, which are connected by wires 35 and 36, respectively, with the exit wire 27. These emergency electrodes are at a greater distance above the normal level of the mercury mass P, than are the regular electrodes 16 and 17; but the distance between these electrodes 20 and 21, and the normal mercury level is less than the distance from the normal mercury level to the upward terminations 41, of the contracted bottom 40, of the channel R. The purpose of these emergency electrodes is to close the circuit in the event that the interior labyrinth of channels and the inertia switch are out of order. Assume that this is the case, then if the machine tilts to the right so that the electrode 17, is submerged in the mercury mass P, no circuit will be closed until the tilt continues still further, thereby submerging the electrode 21, as well. In such case the current flows from the electrode 17, through the mercury to the electrode 21; thence by wires 36 and 27, to the closed switch X; thence by wire 28, closed switch O, wire 29, wire 2, generator M, wires 3 and 9, electro-magnet I, wire 10, brush 11, contact plate 12, wire 13, contact $u$, wire 37, closed switch $y$, and wires 38 and 39, back to the electrode 17. This magnetizes the electro-magnet I, and sets the restoration mechanism into action. Similarly, if the tilt is in the opposite direction, the current is not closed until both electrodes 16 and 20, are submerged. In this case the circuit is closed which includes the electro-magnet H, and when it is magnetized, the rectifying mechanism is set into action.

Reference has been made to the adjustment of the mechanism so that the rectifiers cannot be deflected beyond a predetermined angle, the angle giving the rectifiers a maximum of efficiency to rectify the flying machine. Ordinarily, the angle of tilt does not require the maximum deflection of the rectifiers as has been shown, because the mechanism so acts that the angle of the rectifiers depends on and bears a direct relation to and is in concurrence with the angle of tilt of the machine. Although the machine may tilt to a greater degree or turn upside down the rectifiers must not be deflected beyond this maximum angle of efficiency. To make such adjustment of the rectifiers, the brushes 6 and 11, and brush contact plates 7 and 12, with their non-conductive plate 60, as shown in Fig. 3, are employed. The conductive contact plates 7 and 12, are fixedly carried by and insulated from rack 51, and they extend through a sufficient arc to remain in contact with their respective brushes 6 and 11, throughout the entire range of swing of support S, to which rack 51 is adjustably attached. Each brush 6 and 11, is adjustably secured to a fixed plate 47, by the curved slot and thumb nut screw construction illustrated in Fig. 3, so that the appropriate relation between the brushes and the contact plates is always maintained to conduct the current. It will be seen that, as the support S, (carrying the rack 51 to which the contact plates 7 and 12, are fixed) rotates on axle $z$, each of the brushes 6 and 11, now fixed to plate 47, will slide on its own contact plate, and the current will continue to flow until brush 6, reaches the non-conductive plate 60, or if the current is passing through the other circuit, until the brush 11, reaches the non-conductive plate 60. Therefore, to limit the angle of deflection or tilt of the rectifiers, for automatic or for mechanical control, it is only necessary to adjust the brush supports or sleeves 48, so as to leave the desired arc between each brush and the non-conductive plate 60, at the end of each contact plate. This should be done when the support S, and the machine are level. The extent of deflection of the rectifiers is dependent upon the length of the arcs of the plates 7 and 12.

Attention has been directed to the circumstance that the automatic mechanism is adapted to maintain the machine at any desired lateral tilt as in the case of going around curves. Assume, for example, that the machine is to be maintained at a tilt of 15 degrees. In that event, if the centrifugal force on the mercury is not sufficient, the support S, should be itself manually tilted on its own axle $z$ enough to make the 15 degrees, and then the automatic mechanism will act on the rectifiers to tilt the machine until it has reached the angle of 15 degrees at which inclination the ailerons will again become parallel with each other and with the plane of the machine, and the support S, will return to its normal level with both of its electrodes 16 and 17, out of contact with the mercury. Thereafter, the automatic mechanism will maintain the inclination at 15 degrees. If it deviates either above or below this inclination the automatic mechanism will restore the machine to the inclination of 15 degrees.

To enable this adjustment to be made, the upright handle 49, (Fig. 3) is used. This handle is permanently fixed to the support S, which freely turns on the axle $z$, and it is equipped with a switch X, consisting of two spring conductive plates 53, which normally bear against each other to let the electric current flow, and with pivoted contact levers 50 and 54. Lever 50, at its lower end engages a rack 51. Rack 51, is adjustably fixed to and at the side of the support S, and centrally turns on axle $z$, and is permanently fixed to rack Z, being on the same plate. When the dog tooth 52, is disengaged from rack 51, by manually pressing lever 50, the left hand stud 55, separates the plates 53, and breaks the circuit after which the handle 49, can be manipulated to turn the support S, to the desired angle, immersing electrode 16 or 17, according to the direction support S, is turned, at which time the dog tooth 52, is dropped back into the rack 51, by releasing levers 50 and 49, and immediately the circuit is again closed through plates 53, and the mechanism will itself automatically return the support S, to normal level, and concurrently deflect the rectifiers. Now the deflected rectifiers will bring the machine to a tilt corresponding to the angle the rectifiers were thus deflected, the rectifiers themselves concurrently returning to their normal position parallel with the planes of the machine. The brushes 6 and 11, are not molested by the operator during this occurrence, and when the angle of the rectifiers is once adjusted for a given machine to the maximum efficiency of rectification the adjustment should not be changed.

In case the operator wishes to do so, the machine can be stabilized by hand manipulation of the handle 49, but this can not properly be done unless the hand lever 54, carrying right hand stud 55, is pressed to keep broken the circuit at switch X, as the automatic manipulation may at times be out of harmony with the hand manipulation. Then by moving the handle 49, which is fixedly attached to the support S, the rack 51, will be turned through the dog tooth 52. Rack Z, moves with rack 51, as they are made on the same plate, which in turn rotates the drum C, through the pinion Y, thereby deflecting the rectifiers A. Thus, the rectifiers can be manipulated by hand with lever 49, without the contribution of the automatic or mechanical features.

It will be seen also that the circuit may be broken for wholly hand manipulation by first manually opening the knife switch O, Fig. 9, or by first manually opening the hand knife switches $y$, by pulling out the lever N, Figs. 5 and 6. But for temporary hand manipulation it is safer to use the spring switch 54, leaving switches O, and $y$, closed, for the reason that should the hand be removed from the lever 54, by fainting of the operator or otherwise, the circuit is automatically closed at the switch X, by the spring 56, to insure the immediate automatic return to the automatic control.

The mechanical control shown in Figs. 5, 6 and 9, may be operated with the hand knife switch O, either open or closed, but such mechanical control cannot be had unless the hand lever N, is open, and the wholly automatic control cannot be had unless all the switches O, X, and L, are closed.

Each of the channels R and T, has an opening adapted to be closed by a thumbscrew plug 57, at the normal mercury level. When either of these plugs is removed the corresponding channel can be filled with mercury. A convenient way of filling is to fill each channel with more than the desired amount of mercury when the support S, is turned from its normal position so as to raise the openings from the position shown in Fig. 9. Then on turning the support to the normal position the surplus mercury will flow out until the proper level is secured; whereupon the plugs are again put in place.

Figure 11:
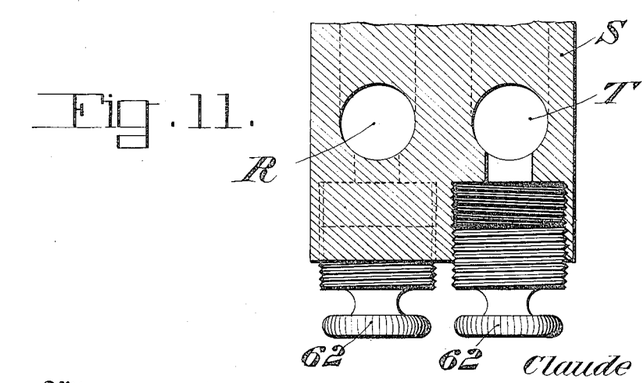
Fig. 11, is a detail view of the mercury adjusting plugs which are employed.

Also, each of the channels R and T, at the bottoms thereof, has an opening of say twice the cross section of T, or R, at its largest sections, and fitted with a tightly fitting thumb screw plug 62, (Fig. 11) which will barely reach the channels when screwed home. When the plugs are only partly in, the holes will form chambers in communication with their respective channels and into which mercury will lodge. The adjustment of these screw-plugs raises or lowers the mercury level of P or Q, as desired, to vary the degree of tilt of the machine necessary to put the electrodes 16 and 17, in contact with the mercury, or to submerge the electrodes 14 and 15, more or less deeply, as desired. This feature regulates the sensitiveness of the mercury contact mechanism and of the anti-oscillating mechanism. The thumb screw plugs 62 should only be about half way in when the channels are being filled.

It is apparent that the mechanical control mechanism of switch L, Figs. 5 and 6, need not necessarily be bolted or attached to the frame of the controller itself, but may be attached at a point convenient for manipulation by the operator, in which event the wires (preferably soft tinsel cords) 1, 8, 13, 32 and 39, would be lengthened.

Again, it is apparent that the operator, to control the machine by hand may use the wheel or lever already on his machine to the exclusion of the levers 49 and 54, Fig. 9, provided he previously or concurrently breaks the electric circuit to prevent the automatic control from interfering. The circuit may be broken by opening knife switch O, or by opening the lever N, of switch L, to break the circuit at y, or a spring knife switch may be inserted in the circuit somewhere in wire 28, or wire 29, and attaching such switch to the wheel or lever to be handily pressed by the operator as he hand controls his machine, so that when the spring lever is pressed the circuit is broken but when the hand is removed the circuit is again closed to reinstate automatic control. The action of such a spring switch is the same as the action at lever 49, and spring lever 54, and the switch X, when being hand controlled.

While the detailed description thus given has related specifically to the mechanism for rectifying the machine when tilted laterally to a different plane from that intended, it is apparent that the second controller illustrated in Figs. 1 and 2, will act in just the same way to govern the rear aileron or rectifier B, which determines the angle of flight. The controlling mechanism will automatically retain any given angle of flight by appropriate adjustment just as in the case of the controller which automatically governs the lateral tilt. Also, the mechanism is designed and the principle is the same likewise to control, stabilize and rectify all air-craft and water craft including torpedoes and submarines by similar means of rectifiers. The control applies to all kinds of rectifiers, including planes and propellers.

I claim in a traveling machine the following characteristics and combination of characteristics, namely:

1. An automatic electric controller to control the rectifiers to rectify the machine, said controller having an electric gravity switch, and a gravity-inertia switch which automatically breaks the circuit in case the gravity switch closes the circuit through momentum as contrasted with the tilt of the machine.

2. A controlling mechanism having rectifiers, in combination with an automatically acting electric switch; a movable support for said switch; two contact plates connected to said support and operatively connected with the rectifiers; and an adjustable brush contact coöperating with each contact plate, each brush and the corresponding contact plate being included in an electric circuit governed by said switch, an excessive movement of the support breaking the contact between the active brush and its contact plate thereby limiting the extent to which said rectifiers can be moved.

3. A controlling mechanism having rectifiers, in combination with an automatically acting electric switch; a movable support for said switch; a rotatable disk operatively connected with the rectifiers and adjustable relatively to said support; two curved contact plates on said disk; and an adjustable brush contact coöperating with each contact plate, each brush and the corresponding contact plate being included in an electric circuit governed by said switch, an excessive movement of the support breaking the contact between the active brush and its contact plate thereby limiting the extent to which said rectifiers can be moved.

4. A controlling mechanism having rectifiers, in combination with a support having an electric gravity switch and an electric gravity inertia switch, said support being adjustable relatively to the rectifiers whereby the machine can run at any desired tilt or angle and can maintain such tilt or angle automatically.

5. The oscillating support carrying the labyrinth of channels containing the mass of mercury constituting the gravity-inertia switch, said labyrinth including two horizontally extending tubes and electrodes close to the axis on which the support turns and submerged in the mercury during the normal action of the apparatus.

6. A labyrinth of channels and electrodes for the mass of mercury constituting the gravity-inertia switch comprising an endless circumferential channel, two crosswise channels communicating at their outer ends with the circumferential channel and with radial channels connecting their inner ends with the circumferential channel, and electrodes 15 and 14 normally submerged in the mercury near the center on which the support turns, and electrodes 18 and 19 in the circumferential channel normally disengaged from the mercury but in communication with electrodes 15 and 14 respectively.

7. A rotating wheel carrying a movable coupler and a sliding armature operatively connected with said coupler, in combination with an electro-magnet having a core coöperative with said armature, whereby when said electro-magnet is energized, the armature is retarded by the magnetic effect and the coupler is moved into its coupling position.

8. A movable support carrying an electro-gravity switch, said switch comprising an endless channel containing a mass of mercury and two electrodes normally slightly and adjustably above the level of the mercury and two other electrodes higher up at opposite sides of the support, the channel being contracted at its bottom to minimize the splashing of the mercury, and fitted with adjustable plugs to raise or lower the mercury level.

9. The movable support having the labyrinth of tubes containing the mercury constituting the gravity-inertia switch and comprising the circumferential channel T having the upper and lower reduced sections 42 and 43 and enlarged side sections 44, the enlarged cross channels U, the inclined restrictive channels V, the contracted vertical channels W, in combination with the electrodes located in the contracted vertical channels at the upper ends of the channels V, the projections 46, and the electrodes 18 and 19 in channel T normally above the surface of the mercury but in direct communication with electrodes 15 and 14 respectively and a plug at the bottom of the channel adjustable to raise or lower the surface of the mercury.

10. A rotating wheel carrying a radially moving coupler J, a sliding main armature K mounted on said rotating wheel, and operative connections between said armature and said coupler, in combination with a stationary electro-magnet having a core $j$ coöperative with said armature, whereby when said electro-magnet is energized, the armature is retarded by the magnetic effect and the coupler is moved radially outward, the sliding auxiliary armature $q$ also carried by said wheel and operative connections between said two armatures, whereby the main armature is caused to more effectively engage the core of the electro-magnet.

11. A stabilizing mechanism having an oscillating support carrying an electric gravity switch which closes an electric circuit when the support oscillates, and a gravity inertia switch which automatically breaks the circuit in case the gravity switch closes the circuit through momentum as contrasted with the closing due to the oscillation of the support.

12. The controlling electro-magnets H and I, the gravity switch P, the electrodes 16 and 17 coöperating with said gravity switch and the electric generator in circuit with said electro-magnets and said electrodes, and the cut out switch N adapted in one position to maintain said generator in circuit with said electrodes, and in another position to break the connection there between, in combination with electrodes $t$ and $u$ and the hand controlled switch L, coöperating therewith, said switch being movable into contact with one of said electrodes to close the circuit including one of said electro-magnets, and movable in the opposite direction to contact with the other of said electrodes to bring the other or idle electro-magnet into circuit, and said switch normally occupying a neutral position in contact with neither of said electrodes $t$ or $u$ and stops $x$ on said cut-out switch N which prevent movement of said switch L to contact with either of said electrodes $t$ or $u$ when the automatic gravity switch P is in acting condition.

13. A movable support having a continuous channel R containing a mercury gravity switch P, electrodes 16 and 17 normally above the mercury level at opposite sides of the channel, and electrodes 20 and 21 also in said channel above the electrodes 16 and 17; the labyrinth of channels containing mercury constituting a gravity-inertia switch, said labyrinth comprising continuous channel T, the normally horizontal channels U, the vertical channels W and the inclined channels V, continuous channel T having enlargements 44 opposite the outer ends of the channels U and the channels U being of greater capacity than the channels W, and the extension 46 at the place where each channel U communicates with the enlargement 44 of the channel T, the electrodes 14 and 15 near the middle of the support S at the lower ends of the channels W which are normally below the mercury level of the gravity-inertia switch, and the connected electrodes 18 and 19 in the continuous channel T and above the normal level of the mercury constituting the gravity inertia switch.

14. A magnetic core and an armature therefor having a relative rotary movement, said armature being also mounted to slide tangentially with respect to said core, in combination with a spring which slides the armature in one direction, the movement in the opposite direction being due to the drag of the core when magnetized.

15. The gravity switch and an electrode normally maintaining it in electrical communication with an electric circuit, in combination with the two sets of electrodes 16, 20 and 17, 21, respectively, which are normally out of contact with the gravity switch, the electrodes of each set constituting the opposite terminals of an electric circuit, and the electrodes 20 and 21 being normally farther away from the gravity switch than the electrodes 16 and 17, and both the electrodes of each of said sets being adapted to contact with the gravity switch, thereby closing an electric circuit upon a sufficient tilt in the event that the circuit normally in communication with the gravity switch is broken.

16. The labyrinth of channels containing the gravity inertia switch and coöperating electrodes, said labyrinth comprising two crosswise extending channels separated at their inner ends, the opposite ends of each crosswise channel being in communication above the switch level, and the outer ends of the crosswise channels communicating with each other below the switch level.

17. The gravity inertia switch, and an oscillating support therefor, portions of said switch extending radially with respect to the axis of said support, in combination with two sets of connected electrodes 14, 18, and 15, 19, respectively, said electrodes 14, 15, being located near the axis of the support and being normally in contact with said switch, while the other electrodes 18, 19, are remote from said axis and normally out of contact with said switch.

18. A rotating wheel carrying a movable coupler and a sliding armature operatively connected with said coupler, in combination with an electro-magnet having a core coöperative with said armature, whereby when said electro-magnet is energized, the armature is retarded by the magnetic effect and the coupler is moved into its coupling position, and an auxiliary armature on the wheel operatively connected with the main armature to cause it to more effectively engage the core of the electromagnet.

19. The controlling electro-magnets H and I, the gravity switch P, electrodes 16 and 17 coöperating with said gravity switch, an electric generator, circuit connections between said electric generator and said electro-magnets and said electrodes, a circuit breaking switch N, which when in one position establishes electric communication between said electric generator and said electrodes, and which in another position cuts said electrodes out of electric connection with said generator; in combination with the hand controlled switch L, by means of which both circuits can be controlled when the gravity switch is cut out, said switch N, acting to render said switch L, operable when cutting out the gravity switch.

20. The combination of the rectifiers, electric controllers therefor, an automatic switch normally governing said controllers, a mechanical switch by means of which the electric controllers may be governed when the gravity switch is inoperative, and a switch which renders idle the automatic governance when the mechanical governance is in action and vice versa.

21. A fluid gravity switch, electric circuits controlled thereby and a support for said switch, in combination with a rack Z, means governed by said circuits to rotate said rack in opposite directions, and means to adjustably connect said support and rack in different relative positions.

22. A lever 49, operatively connected with drum C, and the rectifiers, a switch X, normally held closed by springs holding conductive plates 53, a lever 54, designed to be grasped with lever 49, to open switch X, through stud 55, to break the circuit and render idle the mechanical and automatic control, in combination with the automatic controller, whereby when the circuit is thus broken the operator may manually deflect the rectifiers by hand lever or wheel 49, but when lever 54, is released the spring 56, automatically closes switch X, and reëstablishes the electric circuit for automatic and mechanical control.

23. An adjustable support S, for the gravity-inertia switch Q, and the gravity switch P, electrodes 14 and 15, and 18 and 19, coöperating with gravity-inertia switch Q, and electrodes 16 and 17, and 20 and 21, coöperating with gravity switch P, a lever 49 permanently fixed to support S, to freely manually turn support S, in either direction, a pivoted lever 50, which at its lower end has a dog tooth 52, normally caused by spring 56, to engage rack 51, which is permanently connected with rack Z, conductive plates 7 and 12, a switch X, consisting of two conductive plates 53, each fixed by a spring to lever 49 and caused normally to contact by said spring, so that when lever 50, is manually pressed toward lever 49, the left hand stud 55, opens switch X, and breaks the circuit between conductive plates 53, and instantly thereafter dog tooth 52, disengages rack 51, to permit support S, to be turned in either direction, independently of rack 51, to the desired angle and to cause electrode 16 or 17, to contact with the switch P, with the effect that when lever 50, is released dog tooth 52 reëngages rack 51 and instantly thereafter the electric circuit is reëstablished through switch X, magnet H or I, energized by the establishment of said circuit, while the flying machine is at normal level or at any tilt or inclination, the proper revolving wheel F, or G, coöperating with the energized magnet through the coupler J, to engage finger $i$, and turn the winding drum C, to automatically deflect the proper rectifier to the required angle, and concurrently therewith automatically to turn the support S, back to its normal level through pinion Y, rack Z, and dog tooth 52, by which the rectifiers change the position of the flying machine to the desired position and maintain it in that position automatically, and the rectifiers automatically and concurrently return to their normal parallel with the main planes of the flying machine as the flying machine assumes the desired changed position.

24. A switch, electric circuits controlled thereby, and a support for said switch, in combination with rectifiers, an oscillating member operatively connected with said rectifiers, means governed by said circuits for moving said rectifiers and oscillating member, and adjusting means connecting said support and member in different relative positions.

25. A stabilizing mechanism having an electric circuit, a gravity switch normally opening said circuit and closing said circuit on a tilt of the machine, a gravity inertia switch acting to open the circuit by inertia in case the circuit is closed by the gravity switch through inertia as contrasted with a tilt, and an oscillating support for said switches movable toward its normal level to open the circuit when such level is reached.

In witness whereof, I have hereunto signed my name in the presence of two subscribing witnesses.

CLAUDE W. GIBSON.

Witnesses:
T. S. RISSER,
SHADRACH L. HODGIN.